United States Patent
Finkelshtein et al.

(10) Patent No.: US 12,443,690 B2
(45) Date of Patent: Oct. 14, 2025

(54) POST-TAPEOUT RECONFIGURABLE DEVICE

(71) Applicant: Mellanox Technologies Ltd., Yokneam (IL)

(72) Inventors: Dotan Finkelshtein, Yokneam (IL); Roee Moyal, Yokneam (IL); Igor Voks, Yokneam (IL)

(73) Assignee: Mellanox Technologies Ltd., Yokneam (IL)

( * ) Notice: Subject to any disclaimer, the term of this patent is extended or adjusted under 35 U.S.C. 154(b) by 112 days.

(21) Appl. No.: 17/833,963

(22) Filed: Jun. 7, 2022

(65) Prior Publication Data

US 2023/0394132 A1 Dec. 7, 2023

(51) Int. Cl.
*G06F 21/44* (2013.01)
*G06F 9/48* (2006.01)
*G06F 21/00* (2013.01)

(52) U.S. Cl.
CPC ............ *G06F 21/44* (2013.01); *G06F 9/4881* (2013.01); *G06F 21/00* (2013.01)

(58) Field of Classification Search
CPC ............... G06F 21/44; G06F 9/4881
USPC ............................................. 726/21
See application file for complete search history.

(56) References Cited

U.S. PATENT DOCUMENTS

| | | |
|---|---|---|
| 2004/0004968 A1 | 1/2004 | Nassar |
| 2007/0233628 A1 | 10/2007 | Sherwood et al. |
| 2014/0211714 A1 | 7/2014 | Li et al. |
| 2014/0280857 A1 | 9/2014 | Yang et al. |
| 2014/0372567 A1 | 12/2014 | Ganesh et al. |
| 2014/0373020 A1* | 12/2014 | Govindarajeswaran ..... G06F 9/505 718/102 |
| 2015/0016464 A1 | 1/2015 | Chan et al. |
| 2016/0277292 A1 | 9/2016 | Hu et al. |
| 2016/0352538 A1 | 12/2016 | Chiu et al. |
| 2017/0118042 A1 | 4/2017 | Bhattacharya et al. |
| 2020/0028779 A1 | 1/2020 | Ni et al. |
| 2020/0125962 A1* | 4/2020 | von Trapp ......... G06Q 30/0241 |
| 2020/0145371 A1 | 5/2020 | Kimn et al. |
| 2021/0335502 A1 | 10/2021 | Cordell et al. |
| 2021/0352109 A1 | 11/2021 | Hughes et al. |
| 2022/0029962 A1 | 1/2022 | Teo et al. |
| 2023/0073828 A1 | 3/2023 | Vendrow |
| 2023/0336472 A1 | 10/2023 | Huang et al. |

* cited by examiner

*Primary Examiner* — David J Pearson
*Assistant Examiner* — Nega Woldemariam
(74) *Attorney, Agent, or Firm* — PEARL COHEN ZEDEK LATZER BARATZ LLP

(57) ABSTRACT

A computing device which may include a hardware-configurable device reconfigurable to perform a series of logical operations to determine, based on parameters related to execution of a job received by the hardware-configurable device, whether or not the job is permissible for execution.

20 Claims, 3 Drawing Sheets

POST-TAPEOUT RECONFIGURABLE DEVICE

FIELD OF THE INVENTION

The present invention relates to the field of computer networking, and more particularly, to cybersecurity.

BACKGROUND OF THE INVENTION

Typically, when a job is received at a network computing device, the network computing device checks, based on predefined sets of rules, whether or not the job is safe or secure to be executed prior to executing the job. Such check processes are typically hardcoded in the source code of the network computing device and cannot be changed or updated after the tapeout of the network computing device. In order for the network computing device to handle unsupported jobs (e.g., jobs for which no rules were hardcoded before the tapeout of the device) complex software or firmware solutions need to be provided. In some cases, no software or firmware solutions are available. In these cases, new typeout of the network computing device with updated hardcoded check processes is required.

SUMMARY OF THE INVENTION

Embodiments of the present invention may provide a computing device which may include a hardware-configurable device reconfigurable to perform a series of logical operations to determine, based on parameters related to execution of a job received by the hardware-configurable device, whether or not the job is permissible for execution.

Embodiments of the present invention may provide a method which may include, using a computing device operating a hardware-configurable device, reconfiguring the hardware-configurable device to perform a series of logical operations to determine, based on parameters related to execution of a job received by the hardware-configurable device, whether or not the job is permissible for execution.

Embodiments of the present invention may provide a computing device which may include a programmable hardware device and a controller comprising firmware, wherein the controller may execute the firmware to reprogram the programmable hardware device to perform a series of logical operations to determine, based on parameters related to execution of a job received by the programmable hardware device, whether or not the job is permissible for execution.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1:
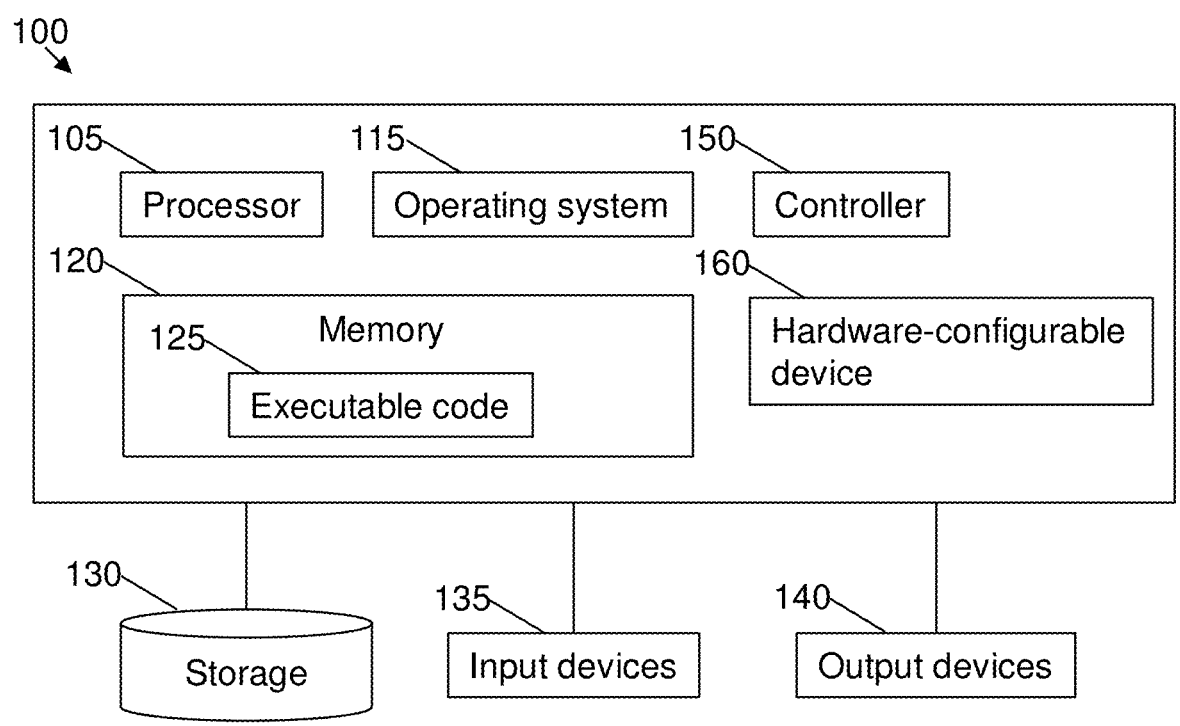
FIG. 1 is a block diagram of an exemplary computing device which may be used with embodiments of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the present invention may improve handling of unsupported jobs by a computing device, e.g. jobs for which no processes determining whether or not the jobs are permissible (e.g. safe or secure) for execution were defined or configured prior to tapeout of the computing device (e.g. before finalizing the design of the computing device to be sent for manufacturing).

The computing device may include a hardware-configurable device. The hardware-configurable device may perform (e.g. may be configured or preconfigured to perform) a series of logical operations (e.g. preconfigured series of logical operations) to determine, e.g. based on parameters related to execution of a job received by the hardware-configurable device, whether or not the job is permissible (e.g. safe or secure) for execution. For example, the computing device may include a controller including firmware etched into the controller prior to tapeout of the computing device, wherein by executing the firmware, e.g. during the startup (e.g. first startup) of the computing device, the controller may configure (or preconfigure) the hardware-configurable device to perform the series of logical operations.

In operation, the hardware-configurable device may receive a plurality of jobs. The hardware-configurable device may perform the series of logical operations (e.g. the preconfigured series of logical operations) to determine whether or not a job received by the hardware-configurable device is permissible for execution. If the hardware-configurable device determines that a job received by the hardware-configurable device is permissible for execution, the hardware-configurable device may execute the job.

If the hardware-configurable device determines that a job received by the hardware-configurable device is not permissible for execution and/or that no series of logical operations has been preconfigured in the hardware-configurable device to determine whether or not the received job is permissible for execution, the hardware-configurable device may not execute the job (e.g. may drop or terminate the job) and/or transmit a respective notification (e.g. including parameters related to execution of the job by the hardware-configurable device), e.g. to the controller of the computing device. A job that is not permissible for execution and/or that no series of logical operations has been preconfigured in the hardware-configurable device to determine whether or not the job is permissible for execution is also referred herein as "unsupported or non-permissible job". The hardware-configurable device may be reconfigured to perform a series of logical operations to determine whether or not a job received by the hardware-configurable device and having the same (or similar) parameters as the unsupported or non-permissible job is permissible for execution. For example, based on parameters of the unsupported or non-permissible job, e.g. if the unsupported or non-permissible job has no security, safety or other harmful issues, the firmware may be updated and re-etched into the controller of the computing device, wherein by executing the firmware (e.g. the updated firmware) the controller may reconfigure the hardware-configurable device to perform the series of logical operations to determine that a job received by the hardware-configurable device and having the same (or similar) parameters as the previously unsupported or non-permissible job is permissible for execution.

In some embodiments, the computing device may be a network interface controller (NIC). However, computing devices other that NICs may be configured to carry out embodiments of the present invention. For example, graphical processing units, central processing units or other computing devices known the art may be configured to carry out the embodiments of the invention.

Embodiments of the present invention may improve handling of unsupported or non-permissible jobs by the computing device by reconfiguring the hardware-configurable device of the computing device, post tapeout, to handle unsupported or non-permissible jobs. Reconfiguration of the hardware-configurable device may be performed in a simple process that may include updating firmware, re-etching the updated firmware into the controller of the computing device and executing the firmware (e.g. the updated firmware) by the controller to reconfigure the hardware-configurable device to handle jobs that were not supported by original (e.g. prior to tapeout) configurations of the hardware-configurable device. This is in contrast to prior art computing devices that typically utilize non-reconfigurable hardware and thus require complex firmware or software solutions to handle or work around the unsupported or non-permissible jobs, or, if no firmware or software solutions are available, new tapeout of the computing devices.

Reference is now made to FIG. 1, which is a block diagram of an exemplary computing device 100 which may be used with embodiments of the present invention. Computing device 100 or elements of computing device 100 (e.g. such as a hardware-configurable device and a controller) may be used to carry out embodiments of the present invention (e.g. as described below with respect to FIGS. 2 and 3).

Computing device 100 may include: a processor 105 that may be, for example, a central processing unit processor (CPU), a chip or any suitable computing or computational device; an operating system 115; a memory 120; a storage 130; input devices 135; and output devices 140.

Operating system 115 may be or may include any code segment designed and/or configured to perform tasks involving coordination, scheduling, arbitration, supervising, controlling or otherwise managing operation of computing device 100 (e.g. scheduling execution of programs or any other suitable operation known in the art). Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different, memory units. Memory 120 may store for example, instructions to carry out a method (e.g., code 125), and/or data such as user responses, interruptions, etc.

Executable code 125 may be any suitable executable code, e.g., an application, a program, a process, task or script. Executable code 125 may be executed by controller 105 possibly under control of operating system 115. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Computing device 100 may include a controller or a microcontroller 150. Microcontroller 150 may be, for example, an integrated circuit chip including one or more processor cores, memory and programmable input/output peripherals. Microcontroller 150 may store and execute firmware.

Computing device 100 may include a hardware-configurable (e.g. programmable hardware) device 160. Hardware-configurable device 100 may include an array of programmable logic blocks and reconfigurable interconnects allowing blocks to be interconnected together causing hardware-configurable device 160 to perform a desired series of logical operations. Example of logic blocks may, for example, include: And_Logic0=parameter_a AND parameter_b; And_Logic1=parameter_c AND parameter_d; . . . And_LogicN=parameter_X AND parameter_Y; or any other suitable logic blocks known in the art. The parameters may be parameters of a job received by hardware-configurable device 160. For example, the parameters of the job may include opcode, opcode mode, size, offload request, transport type or any other suitable parameters known in the art. Example of configurable series of logical operations may, for example, include a configurable logic check, e.g.: Configurable Check Logic0=And_Logic0 OR And_Logic1; or any other suitable series of logical operations known in the art.

In some embodiments, some of the components shown in FIG. 1 may be omitted from computing device 100.

Embodiments of the invention may include one or more article(s) (e.g., memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 2:
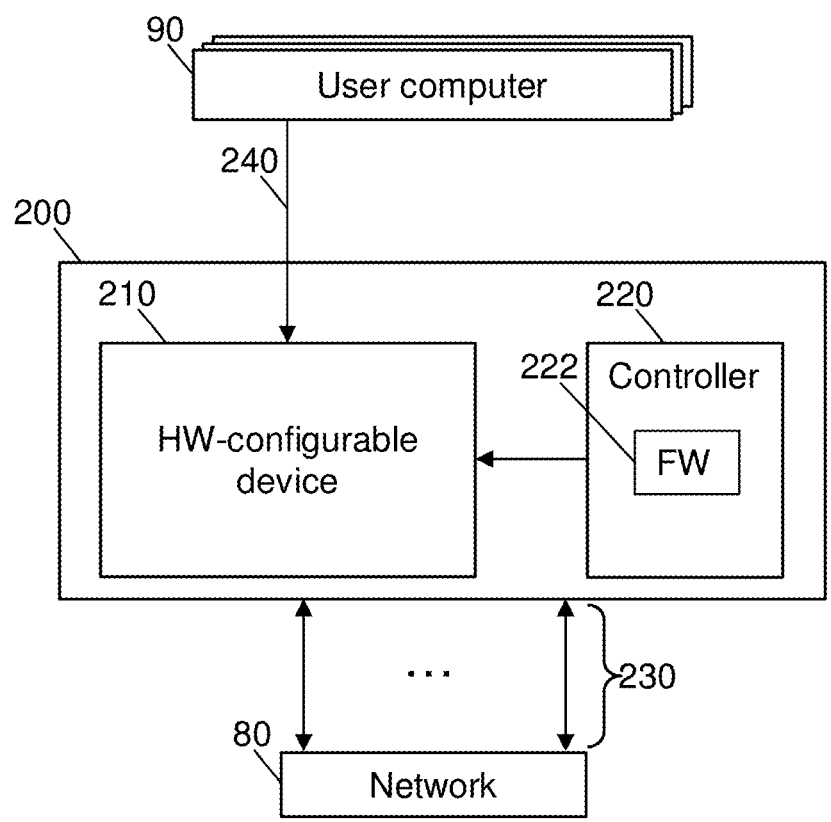
FIG. 2 is a block diagram of a system including a network interface controller (NIC) reconfigurable, post tapeout, to perform logical operations to determine whether or not a job received at NIC is permissible for execution, according to some embodiments of the invention.

Reference is now made to FIG. 2, which is a block diagram of a system including a network interface controller (NIC) 200 reconfigurable, post tapeout, to perform logical operations to determine whether or not a job received at NIC 200 is permissible for execution, according to some embodiments of the invention. Elements and modules of FIG. 2 may be or may be executed by a computer system such as shown in the example of FIG. 1.

According to some embodiments, MC 200 may include a hardware-configurable (e.g. programmable hardware) device 210, a controller (e.g. microcontroller) 220 and a plurality of network ports 230. NIC 200 may provide access for a plurality of user computers 90 to a computer network 80 (e.g., the internet or the "cloud").

Hardware-configurable device 210 may be or may be included in, for example, a transmitter of NIC 200. However, components of NIC 200 other than the transmitter may be or may include hardware-configurable device 210 and may carry out the embodiments of the present invention. For example, a receiver of NIC 200 may be or may include hardware-configurable device 210 and carry out the embodiments of the present invention.

Controller 220 may include firmware 222. Firmware 222 may be etched into controller 220. By executing firmware 222, controller 220 may configure and/or reconfigure (e.g. program and/or reprogram) hardware-configurable device 210 to perform a desired series of logical operations (e.g. as described herein). For example, by executing firmware 222, controller 220 may, for example, configure or reconfigure (e.g. program or reprogram) programmable logic blocks and configure or reconfigure (e.g. program or reprogram) interconnects between the logic blocks of hardware-configurable device 210 to cause hardware-configurable device 210 to perform a desired series of logical operations. During, e.g. startup (e.g. first startup) of NIC 200, controller 220 may execute firmware 222 (e.g. firmware 222 etched into controller 220, e.g. prior to tapeout of computing device 100) to configure (e.g. preconfigure) hardware-configurable device 210 to perform a series of logical operations to determine whether or not jobs 240 received by hardware-configurable device 210 are permissible (e.g. safe or secure) for execution.

In operation, hardware-configurable device 210 may receive a plurality of jobs 240, e.g. from user computers 90. Hardware-configurable device 210 may perform the series of logical operations (e.g. the preconfigured series of logical operations) to determine, e.g. based on parameters related to execution of a job received by hardware-configurable device 210, whether or not the received job is permissible for execution.

A received job to be executed by hardware-configurable device 210 may, for example, include generating and transmitting a packet to network 80. Parameters related to execution of the received job may, for example, include fields and/or subgroups of fields and values contained in the respective fields of the received job. For example, parameters related to execution of the received job may include fields such as opcode fields that may contain values such as "WRITE" (indicating that data need to be transmitted to a remote computing device over network 80) or "GTA" (indicating that a steering table indicating a destination of the received job need to be updated). For opcode "WRITE", the received job may, for example, also have an opcode mode field that may have values such as "0" (indicating that data need to be sent as it is received) or values between "1" and "6" (indicating processes to be applied to the data before the data is transmitted to the remote computing device). For opcode "GTA", the received job may, for example, have an opcode mode field that may have values such as "0" or "1" (indicating the steering table to be updated). Parameters related to execution of the received job may, for example, include an address vector that may include a subgroup of fields indicating the destination of the received job, e.g., in a dynamically changing transport service, that may be provided in a short format or a long format. Other additional and/or alternative examples of jobs and/or parameters related to execution of the job are also possible. Parameters of the job that render the job to be permissible for execution may be dictated by, e.g. hardware capabilities, based on e.g. type of the job or any other suitable parameter of the job. For example, it may be defined that only jobs with opcode field "WRITE" and opcode mode "0" may be permissible for execution. Other examples of the parameters that render the job to be permissible for execution are also possible.

If hardware-configurable device 210 determines that the received job is permissible for execution, hardware-configurable device 210 may execute the received job. For example, if hardware-configurable device 210 determines (e.g. by performing the series of logical operations) that the received job has permissible parameters of, e.g. opcode field "WRITE" and opcode mode "0", hardware-configurable device 210 may execute the job. The execution of the job by hardware-configurable device 210 may, for example, include reading data from a memory, placing data in relevant fields in a memory, generating a packet and transmitting the packet to network 80.

If hardware-configurable device 210 determines that the received job is not permissible for execution and/or that no series of logical operations has been preconfigured in hardware-configurable device 210 to determine whether or not the received job is permissible for execution, hardware-configurable device 210 may not execute (e.g. may drop or terminate) the job. A job that is not permissible for execution and/or that no series of logical operations has been preconfigured in hardware-configurable device 210 to determine whether or not the job is permissible for execution is also referred herein as "unsupported or non-permissible job". For example, if hardware-configurable device 210 determines (e.g. by performing the series of logical operations and based on the parameters of the job) that the received job has different parameters than permissible parameters, e.g. if the received job has opcode field "WRITE" and opcode mode "0" instead of permissible opcode field "WRITE" and opcode mode "0", hardware-configurable device 210 may not execute the job. Hardware-configurable device 210 may, for example, drop or terminate the unsupported or non-permissible job, transmit a notification including the parameters of the unsupported or non-permissible job to controller 220, wherein by executing firmware 222 controller 220 may flush the received unsupported or non-permissible job from hardware-configurable device 210. Based on parameters of the unsupported or non-permissible job, it may be determined (e.g. by the architect or engineering owner of the NIC 200) whether or not the unsupported or non-permissible job may cause safety and/or security issues or harm operation of NIC 200 or other components in the system. If it is determined that the unsupported or non-permissible job has no safety, security or other harmful issues, firmware 222 may be updated (e.g. by firmware engineers) to reconfigure (e.g. when executed by controller 220) hardware-configurable device 210 to perform a series of logical operations to determine that a job received by hardware-configurable device 210 and having the same (or similar) parameters as the previously unsupported or non-permissible job is permissible for execution. Firmware 222 (e.g. updated firmware 222) may be re-etched into controller 222 and executed by controller 220 to reconfigure hardware-configurable device 210 to perform the series of logical operations to determine that a job received by hardware-configurable device 210 and having the same (or similar) parameters as the previously unsupported or non-permissible job is permissible for execution.

Computing devices other that NIC 200 may be configured to carry out embodiments of the present invention. For example, graphical processing units, central processing units or other computing devices known the art may be configured to carry out the embodiments of the invention.

Figure 3:
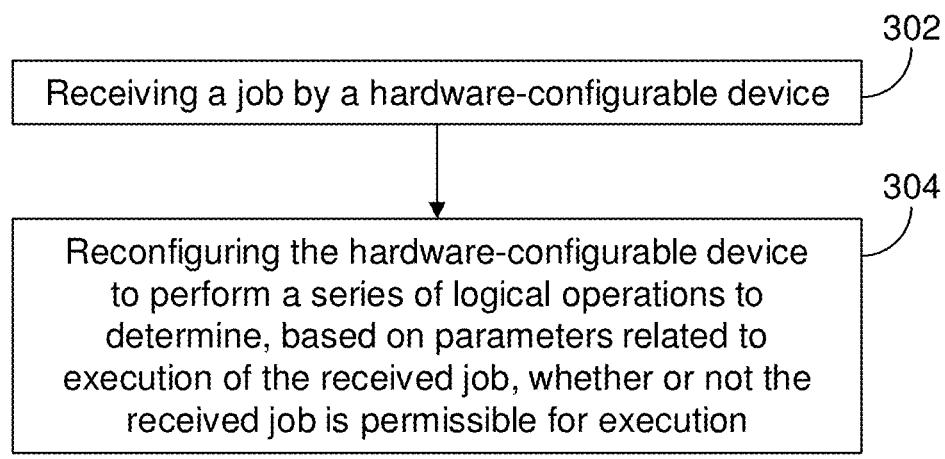
FIG. 3 is a flowchart of a method of reconfiguring a hardware-configurable device post tapeout to perform logical operations to determine whether or not a job received by the hardware-configurable device is permissible for execution, according to some embodiments of the invention.

Reference is now made to FIG. 3, which is a flowchart of a method of reconfiguring a hardware-configurable device post tapeout to perform logical operations to determine whether or not a job received by the hardware-configurable device is permissible for execution, according to some embodiments of the invention. The method may be performed using a computing device, such as the computing devices described with respect to FIGS. 1 and 2, but other systems may be used.

In operation 302, a job may be received by a hardware-configurable device of a computing device. For example, the job may be received by hardware-configurable device 210 of NIC 200 from user computer 90, as described above with respect to FIG. 2.

It may be further determined by the hardware-configurable device by performing a series of logical operations (e.g. a preconfigured series of logical operations) based on parameters related to execution of the received job whether or not the received job is permissible (e.g. safe or secure) for execution (e.g. as described above with respect to FIG. 2).

If it is determined by the hardware-configurable device that the received job is permissible for execution, the received job may be executed by the hardware-configurable device (e.g. as described above with respect to FIG. 2).

If it is determined by the hardware-configurable device that the received job is not permissible for execution and/or that no series of logical operations has been preconfigured in the hardware-configurable device to determine whether or not the received job is permissible for execution (e.g. if the job is unsupported), the received job may be not executed (e.g. dropped or terminated) by the hardware-configurable device (e.g. as described above with respect to FIG. 2). A notification including the parameters of the unsupported or non-permissible job may be transmitted to, e.g. a controller of a computing device. Based on parameters of the unsupported or non-permissible job, it may be determined whether or not the unsupported or non-permissible job may cause safety and/or security issues or otherwise harm operation of the computing device or other components in the system. If it is determined that the unsupported or non-permissible job has no safety, security or other harmful issues, in operation 304 the hardware-configurable device may be reconfigured to perform a series of logical operations to determine, based on parameters related to execution of a job received by the hardware-configurable device (e.g. and having the same (or similar) parameters as the previously unsupported or non-permissible job) wherein or not the received job is permissible for execution (e.g. as described above with respect to FIG. 2).

Embodiments of the present invention may improve handling of unsupported or non-permissible jobs by the computing device (e.g. NIC 200 described above with respect to FIG. 2) by reconfiguring the hardware-configurable device (e.g. hardware-configurable device 210 described above with respect to FIG. 2) of the computing device, post tapeout, to handle unsupported or non-permissible jobs. Reconfiguration of the hardware-configurable device may be performed in a simple process that may include updating firmware, re-etching the updated firmware into the controller (e.g. controller 220 described above with respect to FIG. 2) of the computing device and executing the firmware (e.g. the updated firmware) by the controller to reconfigure the hardware-configurable device to handle jobs that were not supported by original (e.g. prior to tapeout) configurations of the hardware-configurable device. This is in contrast to prior art computing devices that typically utilize non-reconfigurable hardware and thus require complex firmware or software solutions to handle or work around the unsupported or non-permissible jobs.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

The invention claimed is:

1. A post-tapeout reconfigurable computing device for determining whether or not a job received by a device is permissible for execution, the computing device comprising:
   a hardware-configurable device to:
      receive a first job; and
      based on parameters related to execution of the first job, determine that the first job is an unsupported job if no series of logical operations has been configured in the hardware-configurable device prior to tapeout to determine whether or not the first job is permissible for execution;
   wherein the hardware-configurable device comprises an array of programmable logic blocks and reconfigurable interconnects, at least one of the logic blocks and the interconnects being reconfigurable post tapeout to perform a new, not configured prior to tapeout, series of logical operations to determine whether or not a second job received by the hardware-configurable device and having same parameters related to execution of the second job as the parameters related to the first, previously unsupported, job is permissible for execution.

2. The computing device of claim 1, comprising a controller executing firmware to reconfigure the hardware-configurable device to perform the new series of logical operations.

3. The computing device of claim 1, wherein the hardware-configurable device is to:
   if the first job is determined as unsupported, not execute the first job.

4. The computing device of claim 1, wherein the hardware-configurable device is to:
   perform a configured series of logical operations to determine whether or not the first job is permissible for execution; and
   if it is determined that the first job is permissible for execution, execute the first job.

5. The computing device of claim 1, wherein the hardware-configurable device is to:
   perform a configured series of logical operations to determine whether or not the first job is permissible for execution; and
   if it is determined that the first job is not permissible for execution, not execute the first job.

6. The computing device of claim 1, wherein the hardware-configurable device is to:
   if it is determined that the first job is not permissible for execution, transmit a respective notification.

7. The computing device of claim 1, wherein the computing device is a network interface controller (NIC).

8. The computing device of claim 1, wherein the hardware-configurable device is a transmitter of a network interface controller (NIC).

9. A method comprising, using a post-tapeout reconfigurable computing device for determining whether or not a job received by a device is permissible for execution, the computing device operating a hardware-configurable device, the hardware-configurable device comprising an array of programmable logic blocks and reconfigurable interconnects:
   by the hardware-configurable device:
      receiving a first job; and
      based on parameters related to execution of the first job, determining that the first job is an unsupported job if no series of logical operations has been configured in the hardware-configurable device prior to tapeout to determine whether or not the first job is permissible for execution; and
   reconfiguring at least one of the logic blocks and the interconnects of the hardware-configurable device post tapeout to perform a new, not configured prior to tapeout, series of logical operations to determine whether or not a second job received by the hardware-configurable device and having same parameters related to execution of the second job as the parameters related to the first, previously unsupported, job is permissible for execution.

10. The method of claim 9, wherein the reconfiguring is by executing firmware comprised in a controller of the computing device.

11. The method of claim 9, comprising, by the hardware-configurable device:
   if the first job is determined as unsupported, not executing the first job.

12. The method of claim 9, comprising, by the hardware-configurable device:
   performing a configured series of logical operations to determine whether or not the first job is permissible for execution; and
   if it is determined that the first job is permissible for execution, executing the first job.

13. The method of claim 9, comprising, by the hardware-configurable device:
   performing a configured series of logical operations to determine whether or not the first job is permissible for execution; and
   if it is determined that the first job is not permissible for execution, not executing the first job.

14. The method of claim 9, comprising, by hardware-configurable device:
   if it is determined that the first job is not permissible for execution, transmitting a respective notification.

15. A post-tapeout reconfigurable computing device for determining whether or not a job received by a device is permissible for execution, the computing device comprising:
   a programmable hardware device comprising an array of programmable logic blocks and reconfigurable interconnects, the programmable hardware device to:
      receive a first job; and
      based on parameters related to execution of the first job, determine that the first job is an unsupported job if no series of logical operations has been programmed in the programmable hardware device prior to tapeout to determine whether or not the first job is permissible for execution; and
   a controller comprising firmware, the controller to execute the firmware to reprogram at least one of the logic blocks and the interconnects of the programmable hardware device post tapeout to perform a new, not programmed prior to tapeout, series of logical operations to determine whether or not a second job received by the programmable hardware device and having same parameters related to execution of the second job as the parameters related to the first, previously unsupported, job is permissible for execution.

16. The computing device of claim 15, wherein the programmable hardware device is to:
   if the first job is determined as unsupported, not execute the first job.

17. The computing device of claim 15, wherein the programmable hardware device is to:

perform a programmed series of logical operations to determine whether or not the first job is permissible for execution; and if it is determined that the first job is permissible for execution, execute the first job.

18. The computing device of claim 15, wherein the programmable hardware device is to:

perform a programmed series of logical operations to determine whether or not the first job is permissible for execution; and if it is determined that the first job is not permissible for execution, not execute the first job.

19. The computing device of claim 15, wherein the programmable hardware device is to:

if it is determined that the first job is not permissible for execution, transmit a respective notification.

20. The computing device of claim 15, wherein the programmable hardware device is a transmitter of a network interface controller (NIC).

* * * * *